Dec. 11, 1956  O. H. BRILL ET AL  2,773,924
METHOD OF MAKING ELECTRODES FOR ELECTRIC BATTERIES
Filed Jan. 12, 1952
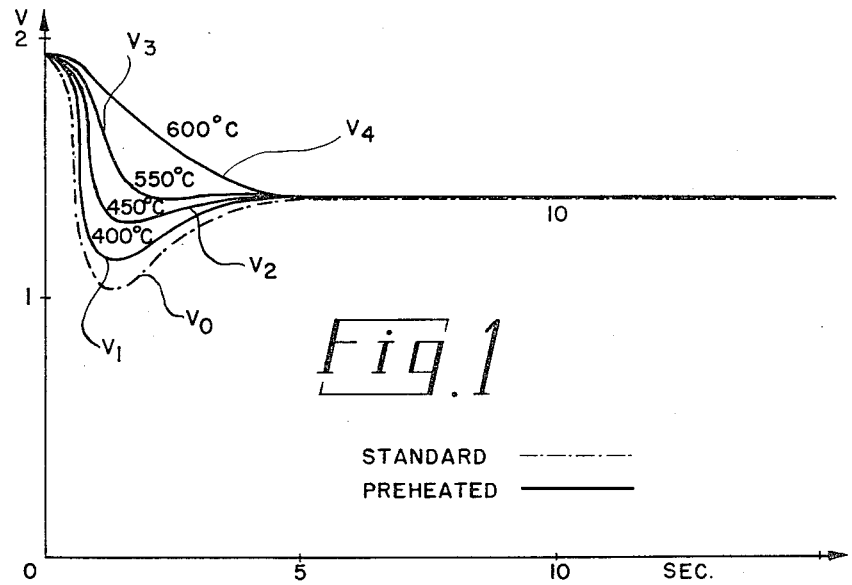
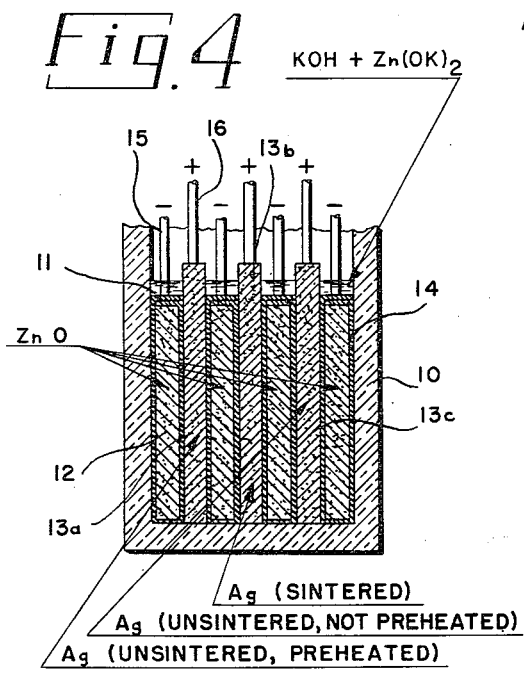
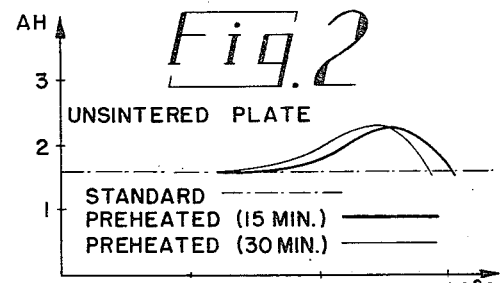
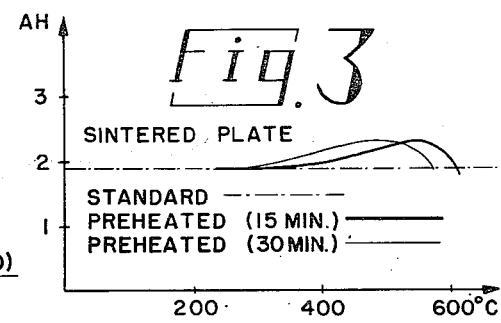
INVENTOR.
OTTO H. BRILL
KENNETH N. BROWN
BY
*Karl F. Ross*
AGENT 2,773,924
Patented Dec. 11, 1956

2,773,924

METHOD OF MAKING ELECTRODES FOR ELECTRIC BATTERIES

Otto H. Brill, New York, N. Y., and Kenneth N. Brown, Teaneck, N. J., assignors to Yardney International Corp., New York, N. Y., a corporation of New York Application January 12, 1952, Serial No. 266,206

3 Claims. (Cl. 136—6)

The present invention relates to electrodes for electric batteries, particularly (but not exclusively) to silver electrodes representing the positive element of an alkaline battery whose negative element is represented by one or more electrodes consisting of a material more electronegative than silver, such as zinc or cadmium.

There has been known heretofore a type of battery electrode whose active portion or portions consist of sintered silver, the electrode itself being preferably in the form of a relatively thin plate adapted to be stacked, along with one or more negative electrodes of similar configuration, in a casing in which the plates are applied under pressure against semi-permeable diaphragms separating electrodes of opposite polarity. The sintered plates are sufficiently porous to enable ready permeation by the electrolyte, being at the same time sufficiently rigid to withstand considerable pressures.

Among the difficulties encountered in the manufacture of a properly sintered plate is the change in volume which the ordinary compressed powder undergoes when being heated to sintering temperature. The behavior of silver powder in this respect is quite erratic and often unpredictable, varying between substantial shrinkage and noticeable expansion. Generally, these volume changes are the more pronounced the smaller the particles of the starting material, so that very fine silver, the use of which may be desirable on account of its large effective surface, is sometimes unsuitable in practice because of the tendency of the plate being sintered to crack during sintering and because of the difficulty to make proper allowance in the mold for volume changes occurring during the sintering process.

An object of the present invention is to provide a method of obviating the difficulties described.

Another object of this invention is to provide a method of so treating a powdered electrochemically active material as to improve the performance of an electrode formed subsequently, with or without sintering, from such material and, in particular, to eliminate a voltage dip heretofore observed in zinc-silver batteries, especially with unsintered silver electrodes, at the beginning of high-rate discharges.

In accordance with the present invention it has been found that the objects set out above can be achieved, and a superior electrode created, by subjecting the powdered active material (e. g. silver) to a preliminary heat treatment before compressing it to form the electrode. In a preferred mode of procedure the powder is heated to a temperature ranging between 400 and 600° C., being thus slightly below the range of preferred sintering temperatures of 650–800° C. After the powder has been agglomerated by the heating process, it is again comminuted to, say, 100 mesh or finer. The resulting powder is then molded and compressed to form an electrode body of a desired shape, e. g. of plate-like configuration, which may then be sintered or used in its unsintered form. If the plate is subjected to a sintering process, volume changes during that process are found to be substantially completely eliminated by virtue of the preceding heat treatment of the powder.

In the accompanying drawing:

Fig. 1 is a graph illustrating the elimination of the voltage dip by the preheating of the powder of the positive electrode;

Fig. 2 is a graph illustrating the effect of the preheating of silver powder upon the capacity of a battery whose positive electrodes are made of said powder without sintering;

Fig. 3 is a graph similar to Fig. 2 but relating to a battery wherein the positive electrodes have been sintered; and Fig. 4 shows, somewhat schematically, a battery comprising both preheated and non-preheated electrodes of the type discussed above.

In Fig. 1 there is shown in dot-dash lines (curve $V_0$) the terminal voltage, plotted against time (in seconds) in the early stages of a high-rate discharge, of an alkaline battery the positive electrodes of which consist of compacted, unsintered silver powder without preliminary heat treatment. It will be observed that the terminal voltage drops within about two seconds from its open-circuit value of 1.85 volts to a low mark of about 1 volt, thereupon slowly rising to a level of about 1.3 volts which it maintains substantially to the end of the discharge. The figure shows four additional curves, $V_1$–$V_4$, illustrating the effect of preheating to various temperatures (but without subsequent sintering) upon the performance of the battery. Thus curves $V_1$ and $V_2$ represent preheating temperatures of 400° C. and 450° C., respectively, with a progressive reduction of the dip; for a preheating temperature of 550° C., represented by curve $V_3$, the dip has been completely eliminated, whereas curve $V_4$ illustrates the conditions obtaining after preheating to 600° C. whereby the dip is converted into a slope.

In Fig. 2 there is plotted the capacity of a silver-and-zinc battery, as hereinabove described, against the temperature to which the silver powder of the positive electrode (or electrodes) is subjected during the preliminary heat treatment; the plates pressed from the preheated powder are not sintered thereafter. Two resulting curves are shown in solid lines, one (heavy) for a treatment period of 15 minutes, the other (light) for a treatment period of 30 minutes. For purposes of comparison there has been indicated by a dot-dash line the average capacity level attained by batteries with unsintered electrodes made without preliminary heat treatment.

It will be noted that with the 15-minute treatment there occurs a marked increase of capacity between 500 and 600° C., with a peak at approximately 550°. Upon increase of the treatment time to half an hour the peak shifts toward the lower temperatures. The most satisfactory results may thus be obtained with heating periods ranging from a few minutes to about an hour, considerably longer heating periods tending to render the silver unmanageable. Generally speaking, the minimum time varies with the size of the charge since, of course, sufficient time must be allowed to enable all of the powder to reach the desired temperature.

Fig. 3 shows the standard capacity level for sintered-electrode batteries and two curves applying to electrodes made from preheated powder and subsequently sintered, the results obtained by the treatment according to the invention being analogous to those shown in Fig. 2 for unsintered plates. It should be noted that as the normal level of the sintered-plate battery may already be somewhat higher than that of a battery having unsintered electrodes, the improvement due to preheating may be slightly less marked in the case of Fig. 3; a clearly discernible peak is, however, also present in this case.

Fig. 4 shows a casing 10 of insulating material, filled with an alkaline electrolyte 11. Immersed in this electrolyte, and held under pressure in the casing 10, are a series of negative plate electrodes 12 alternating with positive plate electrodes 13a, 13b, 13c. An envelope 14 of semi-permeable separator material, e. g. cellophane, surrounds each negative plate electrode 12; similar envelopes may, of course, also be provided around the positive electrodes but have not been illustrated. Negative leads 15 and positive leads 16 extend from the corresponding electrodes to respective terminals (not shown).

The negative electrodes 12 initially consist, primarily, of powdered zinc oxide which in the subsequent charging of the battery is reduced to metallic zinc. The positive electrodes 13a, 13b, 13c consist, essentially, of silver which during charging is oxidized; electrode 13a is preheated but not sintered, as discussed in connection with Fig. 2; electrode 13b is sintered and may or may not have been heat-treated in the manner described with reference to Fig. 3; and electrode 13c is of the unsintered, non-preheated type whose performance has been illustrated by graph $V_0$ in Fig. 1.

Since the voltage curve of a sintered electrode, whether preheated or not, is rather similar to that shown at $V_4$ (Fig. 1) for an unsintered electrode made of powder which had been heat-treated at high temperatures, an almost completely horizontal voltage characteristic may be obtained by the judicious combination of sintered and unsintered plates with one another and/or with unsintered plates made from suitably preheated powder. Thus it will be understood that the combination of one or more plates producing a voltage similar to that shown at $V_0$, exhibiting a dip near the origin, with one or more plates producing a voltage substantially following curve $V_4$, i. e. exhibiting a slope near the origin, will yield a resultant voltage represented by a substantially straight line. Stated more generally, a combination of electrodes made from powder which had been in part treated at relatively elevated temperatures and in part treated at substantially lower temperatures, or not heat-treated at all, may be utilized to obtain a variety of desired characteristics, the particular combination shown in Fig. 4 being only a possible example.

It will be understood that the invention is not limited to the particular embodiment described and illustrated, and that the specific values given are illustrative rather than limitative.

What is claimed is:

1. A rigid, porous electrode plate for an electric battery, said plate being formed by agglomerating a powder composed in major part of silver particles by heating, comminuting the agglomerates thereby formed, molding the resulting comminution product under pressure to a porous plate-like configuration of predetermined dimensions, and sintering the molded plate to produce the solid electrode plate.

2. A rigid, porous electrode plate for an electric battery, said plate being of the structure formed by agglomerating a powder composed in major part of silver by heating said powder to a temperature in the range from substantially 400° C. to 600° C., comminuting the agglomerates thereby formed to particles of predetermined maximum size, molding said particles under pressure to a porous plate-like configuration of predetermined dimensions, and sintering said molded plate.

3. The method of making a rigid, porous electrode, composed substantially entirely of silver, for an electric battery which comprises the successive steps of heating a powder composed substantially entirely of silver in the range of substantially 400° C. to 600° C. until the particles of said powder agglomerate, comminuting the agglomerated particles to a fine powder, molding said fine powder under pressure to a porous plate-like configuration of predetermined dimensions, and sintering said molded plate at a temperature of substantially 650° C. to 800° C. without substantial change in dimensions.

References Cited in the file of this patent

UNITED STATES PATENTS

| | | |
|---|---|---|
| 882,144 | Edison | Mar 17, 1908 |
| 975,980 | Morrison | Nov. 15, 1910 |
| 1,509,138 | Grafenberg | Sept. 23, 1924 |
| 1,838,831 | Hochheim et al. | Dec. 29, 1931 |
| 2,544,112 | Schneider | Mar. 6, 1951 |
| 2,594,711 | Andre | Apr. 29, 1952 |
| 2,601,133 | Yardeny | June 17, 1952 |
| 2,615,930 | Moulton et al. | Oct. 28, 1952 |

FOREIGN PATENTS

| | | |
|---|---|---|
| 311,141 | Great Britain | May 9, 1929 |

OTHER REFERENCES

Treatise on Powder Metallurgy, vol. II, Interscience Publishers, Inc., New York, 1950, pp. 481, 482.

Powder Metallurgy, by Baeza, 1943, pages 29, 39–43.

Treatise on Powder Metallurgy, Goetzel, vol. 1, 1949, pages 65–69.